United States Patent Office 3,418,476
Patented Dec. 24, 1968

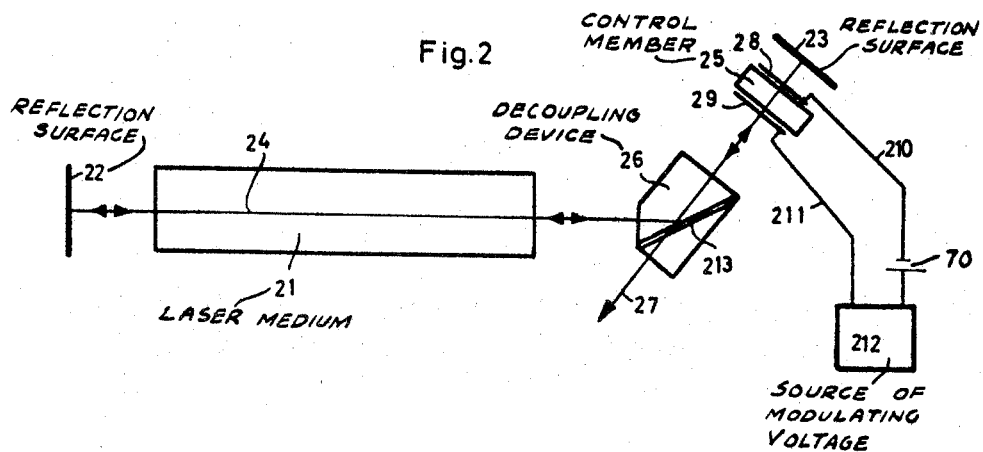
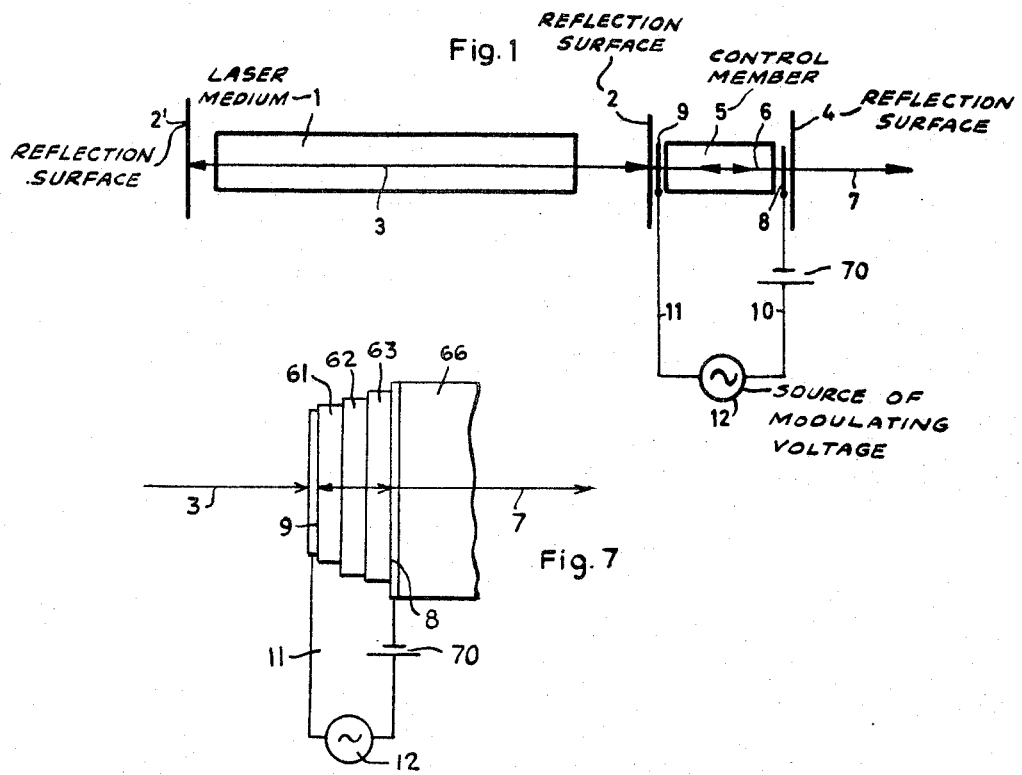

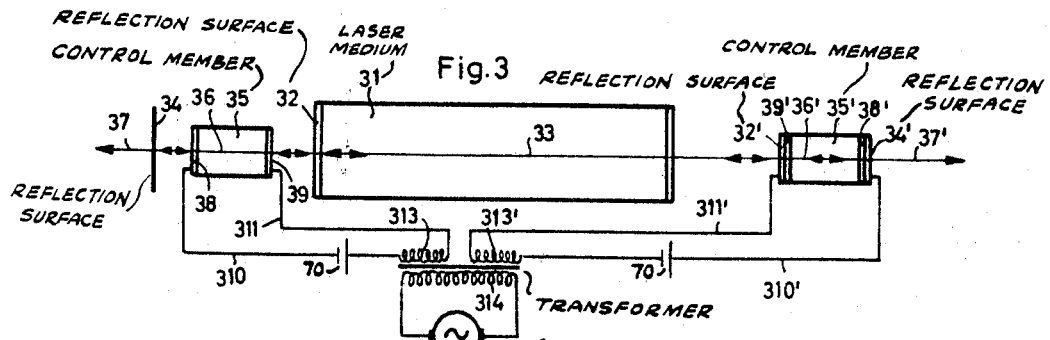
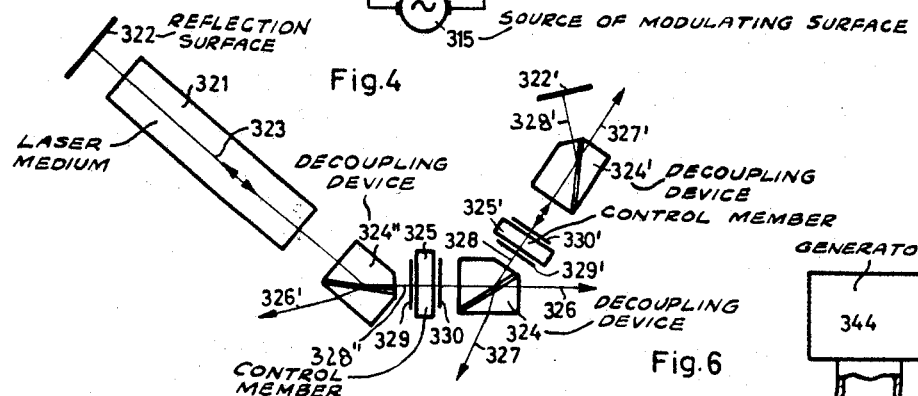
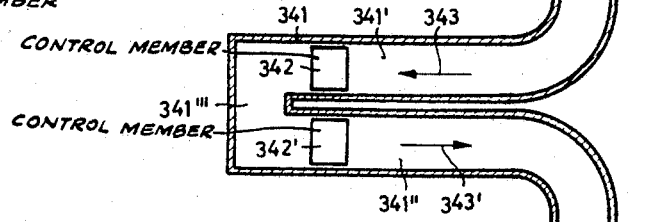
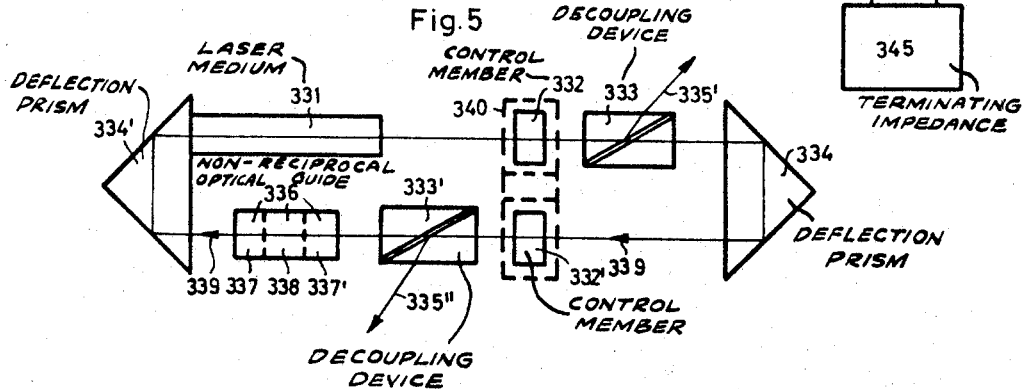

3,418,476
DEVICE FOR INTERNAL MODULATION OF
LASER RADIATION
Rudolf Müller, Strasslach, near Munich, and Karl Gürs, Munich, Germany, assignors to Siemens Aktiengesellschaft, a corporation of Germany
Filed Apr. 8, 1964, Ser. No. 358,303
Claims priority, application Germany, Apr. 11, 1963, S 84,739; Apr. 16, 1963, S 84,715; May 22, 1963, S 85,344
5 Claims. (Cl. 250—199)

Our invention relates to devices for modulating coherent monochromatic radiation generated or amplified on the maser or laser principle.

As a rule, the modulation of such radiation, for example the modulation of laser radiation for the purpose of transmitting communication, is performed by subjecting the laser-generated radiation to a modulating effect outside of the laser resonator proper, i.e. outside of the resonant system in which the radiation is generated or amplified.

Preferably employed as external modulators are electrically controllable double-refractory cells together with a polarization analyzer and, if necessary, together with a polarizer. Such modulating equipment has been provided with a refractory cell containing nitrobenzene which is electrically double-refracting.

Generally, devices for such "external modulation" of laser radiation outside of the beam-generating system have the disadvantage of requiring enormously high amounts of controlling power for attaining an appreciable degree of modulation, for example of more than 0.2, particularly at high frequencies such as those in the megacycles per second and gigacycle ranges.

According to our prior proposal, published in the German periodical "Zeitschrift für Physik" 172 (1963), pages 163 to 171, dated Jan. 5, 1963, the radiation of a laser can also be modulated inside the laser resonator. This principle of "Internal Modulation" has the considerable advantage over external modulation in achieving approximately the same degree of modulation with a very much smaller amount of modulating power.

When operating with internal modulation, the radiation energy within the laser resonator itself is subjected to control. That is, the modulating control is imposed upon the entire laser radiation contained in the resonator and generated by stimulated emission. As explained in the above-mentioned publication, the control is effected, for example, by placing a double-refracting crystal into the radiation path of the laser radiation within the resonator. Only a portion of the radiative energy contained in the laser resonator is coupled out of the resonator to become available as a modulated beam. This issuance of already modulated radiation is a conspicuous difference from external modulation because the latter involves issuing the radiation unmodulated from the laser resonator and only thereafter subjecting it to modulation.

The method of internal modulation, as previously proposed, involves changing the quality factor of the laser resonator in accordance with the control performance and is therefore still affected by a disadvantage, namely the fact that the quality change limits the modulation frequency in practice to about 10 megacycles per second or more than about 100 megacycles per second, and that, in the range of these relatively low modulation frequencies, the required modulating power increases geratly with the modulation frequency.

As a result, internal modulation on the principle of changing the resonator quality not only imposes a limitation upon the magnitude of the maximal modulation frequency, but also upon the maximal bandwidth available with a feasible expenditure in modulating power.

It is an object of the present invention, therefore, to afford the modulation of laser radiation by means of modulating and decoupling means arranged in the radiation path within the radiator, while obviating the dependency of the modulation upon the upper frequency limit, believed to be inevitable with laser internal modulation, as to modulate with a minimized amount of modulating signal power at high modulating signal frequencies, particularly those higher than about 1 gigacycle per second, and preferably by signals with a bandwidth to about 1 gigacycle per second and to couple out the modulated laser radiation with a minimized or negligible distortion noise factor in the modulated signal radiation.

To achieve these objects, we provide the resonator of a laser with radiation modulating and decoupling means that form part of the resonator and hence are located in the internal reflection path for the monochromatic laser radiation energy generated internally of the resonator. In accordance with our invention, we arrange, design and operate these means and the resonators in a particular manner whereby they partition only a limited minor portion from the internal radiation energy of the resonator, thereby modulating the partitioned-off portion and coupling such portion out of the resonator in a manner whereby the internal radiation intensity is kept at least nearly constant, that is, the internal radiation intensity is only slightly varied by modulation, in order to obviate in the modulated and coupled-out radiation the distortion-noise factor, which in known arrangements is caused by variations of the internal radiation intensity.

In accordance with our invention, the internal radiation intensity in the resonator can be maintained at least nearly but still sufficiently constant to obviate the distortion-noise factor. This is achieved by utilizing coupling modulation with only one modulator and coupler, but by providing, in accordance with the invention, a minimum modulating "high frequency" and by designing the resonator in a manner whereby the "forbidden frequencies" of the resonator itself are different by a sufficient amount from the frequencies of the modulation signal. The amount of the difference depends upon the degree of coupling out. This may also be achieved by the laser push-pull modulation of the present invention by utilizing at least two modulators and couplers, as hereinafter described. The "high frequency" and the "forbidden frequencies" are defined hereinafter in detail.

According to a more specific feature of the invention, we use as laser resonator a reflection arrangement which directs the laser radiation in the resonator through the laser-active material, such as a ruby rod; and we design at least one of the reflector means of such a resonator in such a manner that its reflectivity and transparency (permeability) with respect to the laser radiation is controllable. The controllable reflector thus acts directly upon the radiation contained in the laser resonator; that is, the controllable reflector means constitute boundaries of the resonator and hence are integral with the resonator.

In the preferred embodiments of devices according to the invention, the modulation is effected by means of a reflective-transparent control member whose reflectivity R and transparency (permeability) D for the laser internal radiation are simultaneously controllable by means of an electric field to vary in inverse relation to each other. The reflectivity R of the control member is the percentage of the radiation which in the resonator impinges upon the control member and is reflected back by the control member. The permeability D is the percentage of impinging radiation which the control member permits to pass through. The proportion of radiation which the control member permits to pass from the interior of the resonator through the control member, constitutes the modulated laser beam which is coupled out of the resonator and issued into the environment in accordance with the control effect of the control member. When the reflectivity R and permeability D are simultaneously controlled by an electric field, these two parameters vary in mutually opposed sense. That is, when the reflectivity R of the control member, such as an electrically double-refractory crystal with silvered reflector faces, increases, the permeability D of the member decreases, and vice versa. During such control action, the sum of R and D may remain constant.

This particular way of coupling the modulated radiation out of the internal laser radiation makes it possible, for example with the aid of an only slight modulating power, to separate a 100% modulated laser beam of high intensity from the resonator. This will be readily understood when considering that, even with a small modulating power, i.e. a small degree of decoupling, a high absolute intensity of radiation can be coupled out in view of the fact that the radiation inside the laser resonator is of extremely higher intensity. By contrast, when modulating a laser beam outside of the resonator, the modulating power acts only upon radiation intensity which is already coupled out of the resonator and hence at the modulation moment is considerably weaker than the radiation intensity obtaining within the resonator.

Furthermore, by virtue of the invention, a particularly high degree of total laser efficiency can be attained. The "degree of total efficiency" refers to the ratio of the signal power in the decoupled laser beam to the radiation energy generated in the laser resonator and issuing therefrom.

For achieving laser internal modulation without affecting the quality factor of the resonator, we preferably provide, according to another feature of our invention, a laser modulating system operating on a push-pull principle. In such devices, the quality of the resonator is kept constant despite the fact that a beam of radiation modulated by internal modulation is being coupled out of the resonator. As a result, a device of this type affords operating at high modulating frequencies and with a large modulating bandwidth, while requiring a relatively small amount of modulating power.

According to still another feature of the invention, minimal damping of the laser at a high signal-power output is achieved by operating the device so as to withdraw no radiation intensity from the laser when the modulating signal is absent. This particularly affords operating with a 2-side band modulation at a high modulation degree and with a minimum of distorting noise in the modulated signal.

The foregoing and other objects, advantages and features of our invention will be apparent from the following with reference to embodiments of laser devices according to the invention illustrated by way of example on the accompanying drawings, in which:

FIGS. 1 through 5 illustrate five different devices by schematically exploded views;

FIG. 6 shows in section a detail of FIG. 5; and

FIG. 7 is a view of an embodiment of a combined radiation modulator and decoupler.

In FIG. 1, the laser-active medium 1 of the entire device is constituted by a rod-shaped elongated monocrystal of ruby. However, it may also consist of one or more tubes filled with laser-active gases, such as a mixture of neon and helium. Furthermore, the laser-active component 1 may also consist of a semiconductor body, such as a gallium arsenide crystal, having a p-n junction, or having a transition zone between regions of respectively different dopant concentration which, with a suitable choice of material and dimensioning is known to be likewise applicable as a laser-active material.

The term "laser-active" is understood to mean that the medium having this property permits the generation of microwave or optical radiation by stimulated emission resulting from a change in the population of the energy levels and preponderant to the absorption, so as to result in the emission of a beam of coherent radiation. The physical principles involved, as well as various laser-active materials and basic designs of suitable equipment, including any necessary light sources to provide pumping energy, are known as such. If desired, reference may be had, for example, to the series of articles entitled Lasers—Devices and Systems by S. Vogel and L. H. Dulberger, published in Electronics Oct. 27 to Nov. 24, 1961; and Injection Lasers by M. I. Nathan and G. Burns, published in Electronics Dec. 6 and Dec. 13, 1963.

The laser-active medium is located between a reflector 2' and a reflective arrangement 2, 5, 4 which functions as a controllable interference mirror. The dimensions are such that standing waves of the generated laser radiation are formed between the reflection surfaces at 2' and the controllable interference mirror which thus define a "resonator."

According to the invention, a pair of partially permeable reflectors 2 and 4 are spaced from each other. The reflector 4 extends parallel to the reflector 2. Located between reflectors 2 and 4 is a control member 5 still to be described. Reflector 2 is reflective not only for radiation coming from part 1 but also for radiation coming from the reflective surface of member 4. The arrangement of parts 2, 4 and 5 is that hereinbefore and hereinafter referred to as the "controllable interference mirror" for the laser-resonator radiation, because it has an interference-producing effect due to its controllable reflection and transition ability. The controllable interference mirror 2–5–4 is traversed by the portion 6 of the radiation 3 which issues from medium 1 through reflector 2 and generally amounts to a few percent of the radiation which passes back and forth within medium 1 and between reflectors 2 and 2'.

In the laser device, thus modified according to the invention, the reflectors 2 and 4 define the boundaries of the composite resonator located between them; and the controllable interference mirror permits a larger or smaller proportion of the radiation 6 to issue at 7 out of the entire resonator system. This emitted proportion is dependent upon a control voltage applied to member 5. In this manner, a modulated beam is coupled out of the laser resonator of which the interference mirror forms part.

The controllable interference mirror 2–5–4 in this embodiment has maximal permeability when the optical wave length between the reflectors 2 and 4 just corresponds to an integral multiple of one-half of the wave length of laser radiation, that is, when standing wave of laser radiation can form in the interference mirror.

A slight variation in optical length between reflectors 2 and 4 in the interference mirror, tuned as mentioned above, has the effect that such standing waves of the laser radiation can no longer be formed and that the beam 7 issuing through the interference mirror to the outside is controllably weakened in intensity. In this manner, the controllable change in optical length within the interference mirror modulates the beam of radiation 7 emerging from the laser device.

Such a variation in optical length, which may amount up to a few tenths of the wave length, can be effected by forming the control member 5 from a medium whose refraction index is controllable. Other control methods can also be applied to the interference mirror, for example a variation in distance between the reflectors 2 and 4 produced mechanically. For example, if reflectors 2 and 4 are constituted by mirrored (silvered) end faces of the member, a modulating variation in optical length can be produced by piezoelectric or magnetostrictive action. Generally, however, the maximally attainable modulation frequency producible by mechanical variation in length is too small. We therefore prefer a modulation by electrically controlled variation of the refractive index.

For augmenting the control effect, a plurality of such controllable interference mirrors, preferably having the same design and operation, can be arranged in series. An interference mirror suitable for devices according to the invention may also be constituted by a plurality of dielectric layers aligned in a series and having successively different refractive indices that are controllable in one or more of these layers. The individual layers are given the thickness required for obtaining interferences.

Reverting to FIG. 1, it is preferable to employ potassium dihydrogen phosphate (KDP) monocrystals as modulation control member 5 in the interference mirrors. The refractive index of a KDP monocrystal, placed into an electric field with a given orientation of the crystal axes, is controllable by varying the magnitude of the electric field strength and depends upon the direction and polarization of the light beam passing through the properly oriented crystal.

It is advisable to use a KDP single crystal of a few millimeters length having planar parallel faces in 001 orientation, i.e. cut perpendicularly to the optical axis. The crystal is to be oriented with respect to the laser beams so that the beam 6 impinges perpendicularly upon the just-mentioned faces. It is further preferable to select the polarization plane of the radiation so that the electrical vector of the radiation points in one of the 110- directions. The electrical field is applied to the crystal in the direction of the optical axis, which is coincident with that of the beam 6 passing through the crystal at zero field strength.

In lieu of KDP, other substances having a controllable refraction index can be used, for example electrically or magnetically double-refractive materials such as monocrystals of ammonium dihydrogen phosphate (ADP), or nitrobenzene in a transparent container.

For electrically controlling the refractive index of control member 5, the device shown in FIG. 1 is provided with two electrodes 8 and 9 which are connected by respective leads 10 and 11 to a source 12 of modulating voltage. The electrodes 8 and 9 are either substantially transparent to the laser radiation or they may be constituted by the reflectors 2, 4 such as by the silvering with which the reflective faces of the crystal member 5 are provided. Thus the electrode 8 may be integral with the reflector 4, and the electrode 9 with the reflector 2.

If the interference mirror is so adjusted that it possesses minimal or no transparency to the radiation generated in the resonator when the modulating alternating voltage is absent, then a frequency-doubling of the intensity variation in the decoupled emitted beam 7 is obtained when a modulating alternating voltage is applied.

Such frequency doubling is prevented if the interference mirror is so adjusted that, when the alternating modulation voltage is absent, the beam 7 is coupled out of the resonator. This no-modulation intensity of the emitted beam 7 must be as high above the intensity of minimal decoupling as corresponds to the decoupled signal peak value. The same result can be achieved by applying a direct voltage to the control member in superposition to the alternating modulation voltage. The resulting modulation of the emitted beam 7 is then manifested as an intensity variation superimposed upon the median intensity of the beam 7. In this manner, a beam modulated up to 100% can be coupled out of the laser resonator.

A laser device of the particular type so far described is especially signifiicant for the modulation of laser radiation with signals of high frequencies because the device then affords attaining a large bandwidth of modulation as desired particularly for communication purposes. The "high frequencies" here referred to, are those whose cycle period T is small in comparison with the build-up and decaying periods $\tau$ of laser oscillation resulting in the resonator from a resonator quality change caused by the modulation. A modulation of such a high frequency can no longer, or only incompletely, be followed by the laser by a corresponding variation of the radiation energy contained in the resonator. It can be estimated that this applies to frequencies whose cycle period T is smaller by about the factor 10 than the interval $\tau$. With these high frequencies, the distortions in the modulation of the laser radiation can be kept so slight as to be permissible for most purposes, for example the transmission of communication. The value of $\tau$ can readily be ascertained in each case by conventional measuring, for example oscillographically.

The main significance of the device according to the invention, as described above, resides in the high total degree of efficiency, in conjunction with the fact that, aside from the occurrence of slight modulation distortions that can be kept satisfactorily slight, relatively small amounts of modulating power afford achieving a high degree of modulation, for example the unity value, with respect to the radiation emitted out of the resonator. In this respect, a device according to the invention is distinctly superior over internal-modulation devices as heretofore proposed. This will more fully appear from the following.

With the known internal modulation, essentially the intensity of the radiation energy stored in the resonator is being controlled, and a fixed proportion of this stored intensity is emitted as a modulated beam. With the type of modulation involved in the present invention, however, the intensity of the radiation stored in the resonator is only slightly varied by the modulation. As mentioned, the intensity of the radiation stored in the resonator of a device according to the invention can only incompletely follow a high-frequency modulation, for example above 1 gigacycle per second. The resulting variations of the stored intensity are even kept intentionally so slight that they cannot cause distortion noise in the modulated signal. As will be explained further below, the provision of push-pull modulation according to the invention permits a full elimination of such variations.

A device according to the invention, if given a relatively simple embodiment as exemplified in FIG. 1, involves a design condition for the resonator's optical path length which, in practice, does not constitute a substantial limitation. This is the requirement that the travel time of the radiation within the resonator and the frequencies of the modulation signals must not be in tune with each other. This is because, if the reciprocal value of the travel time were identical with the frequencies of the modulation signal, the flow of energy within the resonator, that is, the internal radiation intensity, would be weakened repeatedly at the same location. It will be readily realized that such weakening would lead to major and possible excessive distortions in the modulation. The resonator's optical path length must be designed so that the reciprocal value of the time required for a forward and return travel of the radiation within the laser resonator and integral multiples of the aforementioned reciprocal value are different from any modulation frequencies of the radiation.

Assume that the time for a forward and return travel of the laser radiation in the resonator is equal to 1 nanosecond. This travel time corresponds to the frequency 1 gigacycle per second. Modulation signals with appreciable intensities of the frequency 1 gigacycle per second as well as its integral multiples would weaken repeatedly at the same location and would lead to major distortions in the modulation. These frequencies are hereinafter called "forbidden frequencies." The same applies to the frequencies of the modulation signal in the immediate vicinity of 1 gigacycle per second and the integral multiples thereof. However, the modulation can be effected, for example, with frequencies below 0.9 gigacycle per second and between 1.1 and 1.9, between 2.1 and 2.9, or between 3.1 and 3.9 gigacycles per second, and so forth. How far the modulation frequencies must be remote from the forbidden frequencies, depends upon how strongly coupling out acts dampingly upon the flow of energy within the resonator. For example, if the particular decoupling degree, that is, the share or portion of intensity of modulated radiation partitioned and coupled out of the radiation intensity internally in the resonator, is smaller than 2%, it suffices to exclude all frequencies that differ from the forbidden frequencies by less than about 10% of the lowest forbidden frequency value. In case of modulated radiation, which includes a direct portion in addition to the alternating portion, the decoupling degree relates only to the alternating portion, since the direct portion cannot produce distortion noise, as evident from the foregoing.

This same frequency spacing to be chosen is also indicative of the lower frequency limit of the above-defined high frequencies.

For high modulating frequencies, the optical travel path of the laser radiation in the control member, such as in the interference mirror 2–5–4 according to FIG. 1, should be kept small, namely so small that the travel time of the radiation within this member or interference mirror amounts, for example, to less than one-quarter of the cycle period of the modulation signal. This takes into account that the travel time of the radiation within an interference mirror constitutes a multiple (such as about ten to twenty times) of the time required for a single forward and return travel of the radiation in the interference mirror. That is, with the usually attainable reflectivity values of the reflector surfaces appertaining to the interference mirror, the radiation will travel approximately that many times back and forth at appreciable intensity within the interference mirror. No difficulties are encountered in a device as described above with reference to FIG. 1 when modulating the laser beam with frequencies up to about 5 gigacycles per second.

Another and particularly advantageous way of practicing the invention relates to its application in conjunction with the known production of linearly polarized radiation in the laser resonator. According to the invention, a control member for modulating the linearly polarized radiation is arranged in the internal radiation path of the resonator itself, in the sense explained above; and the device is further provided with means for coupling out of the resonator a component that is polarized perpendicularly to the linearly polarized radiation generated in the resonator and modulated by the control member.

This type of decoupling the modulated radiation likewise affords emitting a high-intensity beam modulated up to 100% with a relatively small amount of modulating power, and also affords achieving a particularly high total efficiency of the laser.

A preferred embodiment of the kind just mentioned will be described presently with reference to FIG. 2.

Shown at 21 in FIG. 2 is a laser-active medium corresponding to that denoted by 1 in FIG. 1 and consisting for example of a ruby crystal. Denoted by 22 and 23 are reflectors or surfaces between which a forward and return travel of the internal laser radiation, schematically indicated at 24, comes about. A control member 25 is disposed in the radiation path within the resonator to form part thereof, and takes care of internally coupling a portion from the remaining major portion of the repeatedly reflected radiation. Further provided is a device 26 for decoupling the beam 27 that is to issue from the laser device. The decoupling device 26 essentially consists of a Nicol prism but, in comparison with conventional Nicols, is modified for the purpose of the present invention. One edge of the prism 26 is bevelled at such an angle that the radiation beam entering from the left passes perpendicularly to the bevelled face into the prism, thereby minimizing the reflection loss as the radiation passes through the boundary face. The prism 26 is oriented for total and hence loss-free reflection of the radiation 24 at the cemented internal faces 213 of the prism. The prism 26 is arranged in known manner so that only the radiation of a given polarization direction is totally reflected at the cemented boundary face 213. Depending upon the polarity of the double-refractive prism material, the totally reflected radiation is either the component that oscillates in the plane of incidence or the one that oscillates perpendicularly to that plane. By virtue of this particular arrangement of the Nicol prism, only linearly polarized light, namely the one having the oscillating direction required for total reflection at face 213 in prism 26, can be generated in the resonator. Relative to all other oscillating directions of the radiation, the resonator has a considerably lower quality factor. When employing a crystal 21, for example a ruby monocrystal, which already furnishes linearly polarized light and in which the radiation extends perpendicularly to the optical axis, care must be taken that this crystal is properly oriented with respect to that of the Nicol prism 26.

The control member 25 is provided with electrodes 28 and 29 which are connected by respective leads 210 and 211 with a source 212 of modulation voltage. The electrodes 28 and 29 are transparent to the laser radiation 24. It is preferable to have the electrode 28 form an integral part of reflector 23. Thus, electrode 28 may consist of the silvering which, on reflector 23, forms an electrically conducting reflection surface. In this manner, the travel path of the radiation from control member 25 to the reflector 23 and back to member 25 is advantageously reduced to a minimum, as will be further explained hereinafter.

It will be understood that it is usually preferable to have the individual components, shown in FIG. 2 (as well as in FIGS. 1, 3, 4 and 5) in exploded fashion, located close to each other, for example by cementing or otherwise joining them together. This reduces the reflection losses at the boundary faces.

In the embodiment of FIG. 2, the control member 25 is a controllable double-refractive crystal. This crystal may preferably consist of KDP, but other substances can also be employed. Among these are controllably double-refractive liquids such as nitrobenzene, or materials which can be controlled to correspondingly rotate the polarization direction of the radiation, particularly substances that are non-reciprocal with respect to the rotation of the polarization axis. The use of such controllable polarizers is similar to that of controllable double-refraction members in producing a component of laser radiation that is polarized in a direction perpendicular to the polarization direction of the radiation 24 generated in the resonator by the laser action and coupled out of the resonator. The term "non-reciprocal" is understood to mean that the rotation of the polarization direction is not eliminated during the forward and return travel of the radiation through the polarizing material.

Particularly well suitable as material for the control member 25 are the above-mentioned crystals of potassium dihydrogen phosphate (KDP) or ammonium dihydrogen phosphate (ADP), which are both electrically double-refractory. The optical axis of these crystals, under field-free conditions, is preferably oriented nearly or accurately parallel to the radiation 24, as will be further explained hereinafter. One of the $a$-axes of the crystal is placed into the polarization plane of the linearly polarized radiation 24. In field-free condition, the radiation 24 then travels between reflectors 22 and 23 back and forth, being virtually unaffected by the crystals 25 and 26. When an electric voltage is applied between the electrodes 28 and 29, the resulting electrical double-refraction in crystal 25 causes the occurrence of a component which oscillates perpendicularly to the polarization direction of the radiation 24. The intensity of the perpendicular component is dependent upon the magnitude of the control voltage.

The perpendicularly polarized component issues from the decoupling device 26 as the utilizable laser beam 27. Hence, the emerging beam 27 constitutes the portion of radiation contained in the resonator that has been separated from the internal, linearly polarized radiation 24 by the double-refractive action of the control member 25 in the form of a perpendicularly polarized radiation.

Since the electrical double-refractive action of member 25 upon the generated laser radiation 24 is independent of the field direction in member 25, the intensity variations of the emitted beam 27 exhibit frequency doubling.

The frequency-doubling effect can be avoided by additionally impressing a direct voltage between the electrodes 28 and 29. The resulting unidirectional field normally couples a beam 27 of constant amplitude out of the laser internal radiation. The same effect can be obtained by providing for additional, natural double refraction of member 25. A simple way of doing this is to place the optical axis of member 25 not accurately parallel, but slightly at an angle to the direction in which the radiation 24 passes through the member 25. In either case, namely by adjusting member 25 for natural double refraction or by superimposing a direct voltage upon the modulating alternating voltage, the modulation of the emitted beam 27 manifests itself in an intensity variation superimposed upon a constant median intensity of the emitted beam.

The amplitude of the emitted beam of radiation 27 caused by the effect of the above-mentioned natural double refraction or by superposition of direct voltage, is preferably given a magnitude larger than, or equal to, the occurring maximum amplitude of the alternating modulation voltage.

In this manner, the beam 27 coupled out of the laser resonator can be modulated up to 100% at a frequency equal to that of the modulating signal.

With respect to modulation at high frequencies, the explanations given above with reference to FIG. 1, are also applicable to devices of the type described in connection with FIG. 2.

Devices according to FIG. 2 are also subject to the above-mentioned condition that the frequency band of the signal must not include the forbidden frequencies as well as the frequencies in the immediate vicinity thereof.

When operating with high modulation frequencies, the optical travel path of radiation in the control member, as well as the travel path from the control member to the adjacent reflector, for example the distance between member 25 and reflector 23 in FIG. 2, is to be kept as small as feasible. For example, the travel time for the radiation on the path from member 25 to reflector 23 and back to member 25 should amount to less than one-quarter of the cycle period of the modulation signal. No difficulties are encountered with a device according to FIG. 2 when operating with modulation frequencies up to about 10 gigacycles per second.

For still higher frequencies of the modulation signal, it is advisable to design a device according to the invention in such a manner that the control member is located in a type of traveling-field arrangement of the modulation signal. In such a traveling-field arrangement, the laser radiation and the modulation signal will travel beside each other and have at least approximately equal speeds in the same direction. A particular kind of such a device embodies the principle of push-pull modulation explained presently.

A push-pull modulation for the purposes of the invention requires providing at least two modulation and decoupling devices in the internal radiation path of the laser resonator, both modulating the laser internal radiation. At least one modulating device acts in a sense opposed to another one of these modulating devices upon a portion of the resonator losses constituted particularly by the radiation emitted from the resonator. In contrast to the above-described simple decoupling modulation, and also in contrast to the known internal modulation, the push-pull modulation acts upon the laser device in such a manner that the intensity of the radiation contained within the laser resonator maintains a constant value. That is the intensity of the internal radiation does not vary in the rhythm of the modulation, aside from any starting-up oscillatory phenomena and similar non-modulatory phenomena.

The constancy of internal radiation intensity is tantamount to a constant quality factor of the laser resonator. Consequently, the above-mentioned limitation of the maximal modulation frequency in dependence upon the resonator quality is eliminated. Any remaining frequency limitation may result substantially only from the type and operation of the control member itself and from the particular design of the laser; but the attainable maximum modulation frequency can be made very high, such as in the range of gigacycles, as will more fully appear hereinafter.

Push-pull type devices according to the invention compare favorably with external modulation devices as regards reduced modulating power; but, in contrast to the embodiments described above, the push-pull devices do not necessitate excluding any forbidden modulation frequencies.

One way of subjecting the laser internal radiation to push-pull modulation is to provide respective modulating and decoupling devices at both ends of the laser resonator, each of the two control devices being equipped in the above-described manner with reflection means of controllable reflectivity.

Applicable in lieu of controllable decoupling members are also devices which partly dampen (attenuate) the laser internal radiation and are controlled in push-pull relation to each other.

Suitable for the controllable decoupling of laser radiation in push-pull operation are controllable reflection devices of the same type as those described above with reference to FIG. 1, as well as other controllable means that permit coupling a portion of the laser internal radiation intensity, in form of a modulated beam, out of the laser, for example combinations of controllable double-refraction devices and polarization analyzers of the type described above with reference to FIG. 2.

Further details of push-pull modulation laser devices according to the invention will be apparent from the embodiments shown in FIGS. 3 and 4, described presently.

Denoted by 31 in FIG. 3 is the laser-active medium corresponding to the medium 1 in FIG. 1. Two controllable reflection arrangements of the type described with reference to FIG. 1 are arranged in the path of the radiation 33 and couple respective radiation beams 37 and 37' out of the resonator. The components denoted by 32, 34, 35, 38, 39, 310, 311 on the one hand and the parts 32', 34', 35', 38', 39', 310' and 311', as well as the radiation paths 36 and 36' correspond to those denoted in FIG. 1 by 2, 4, 5, 8, 9, 10, 11, respectively.

That is, each of the two control devices located at the respective ends of the laser-active medium 31 in FIG. 3 preferably contains a monocrystalline member to control the optical path length in accordance with an interference mirror, generally of the Fabry-Perrot interferometer type. These interference mirrors may have the design and operation described above. They are controlled in push-pull relation to each other so that the respective intensities of the modulated beams 37 and 37' issuing from the laser resonator have a constant sum value. As a result, the radiation intensity contained in the resonator between the boundaries defined by the outer reflectors 34 and 34' has likewise a constant intensity, excepting any starting-up oscillations or similar phenomena. Thus, the quality of the laser, which otherwise generally limits the frequency of internal modulation, is kept constant despite the fact that an intensity-controlled modulated beam 37, 37' emerges out of the laser system, i.e. from between the boundaries 34 and 34' of the resonator. The intensity modulations of the respective beams 37 and 37' are complementarily related to each other.

Denoted by 38, 39 and 38', 39' in FIG. 3 are the electrodes which produce the respective electric fields in the control members 35 and 35'. The electrodes 38, 39 and 38', 39' are either substantially transparent to the laser radiation, or the electrode 38 is integral with the reflector 34, and the electrode 39 is integral with the reflector 32 in the manner explained above. Accordingly, electrode 38' may be integral with reflector 34', and electrode 39' integral with reflector 32'. The electrodes are connected by leads 310, 311 and 310', 311' to respective secondary windings 313 and 313' of a transformer 314 energized from a source 315 of modulating voltage.

The controllable interference mirrors 32–34–35 and 32'–34'–35' are adjusted so as to have median transparency to the laser radiation in the event no voltage is applied between electrodes 38 and 39 or 38' and 39'.

The permissible maximum frequency of modulation in this device is determined by the travel periods of the radiation in the laser resonator, particularly by the travel time in the controllable interference mirrors. In general, the time required for the radiation to repeatedly travel forward and back within each interference mirror, and to travel between the reflection surfaces that constitute the boundaries of the laser resonator, must be smaller than the cycle period of the modulation frequency.

For increasing the maximal modulation frequency, the control members for mutually complementary, push-pull modulation should be as close as feasible to each other so that they are successively traversed within shortest feasible time by the radiation to be controlled.

A device of this type is illustrated in FIG. 4. This device is equipped with the same modulating and decoupling means as those shown in FIG. 2 and described above, except that these means are duplicated. Denoted by 321 in FIG. 4 is a laser crystal corresponding to medium 1 in FIG. 1. Denoted by 322 and 322' are reflectors for the radiation 323 produced in the laser crystal. On its travel between the laser crystal 321 and the reflector 322', the beam of radiation passes through the decoupling member 324 and the two control members 325 and 325'. The two control members in this embodiment are formed of substances having controllable double-refractory properties with respect to the laser radiation. For this purpose, the members 325 and 325' may consist of cells filled with nitrobenzene. However, it is preferable to use members 325 and 325' consisting of controllably double-refractory crystals such as potassium dihydrogen phosphate (KDP).

The crystals 325 and 325' are so oriented that the polarization direction of the radiation 323 produced in medium 321 and being linearly polarized, if necessary with the aid of additional polarizing means, is converted to elliptically polarized light due to the effect of the controllable double refraction. The radiation issuing from the crystals 325, 325' contains a component which oscillates perpendicularly to the polarization plane defined by the radiation 323 at the locality where it impinges upon the crystals 325, 325'. The bevelled double prisms 324, 324' and 324" couple the just-mentioned components of radiation out of the laser resonator as modulated beams 326, 326' and 327, 327'. Beam 326 results from the abovementioned component of radiation 323 which enters into the double crystal 324 after passing through the control crystal 325. Beam 326' results from the component radiation 323 which, after passing through control member 325, enters into the second double crystal 324". Beams 327 and 327', issuing from the decoupling double crystals 324 and 324' respectively, result from the perpendicular component of radiation 323 afer the radiation passes through control member 325'.

The three decoupling members 324, 324' and 324" in FIG. 4 are essentially Nicol prisms which have one of their respective edges so bevelled that the radiation beam 325 entering at or leaving 328, 328', 328" passes perpendicularly through the bevelled face. This reduces the reflection losses compared with those occurring at an acute angle of incidence. In contrast to the conventional use of a Nicol prism, the beam mirrored by total reflection is kept between the reflectors 322 and 322' because the latter beam is subjected in the Nicol to smaller losses than the beam which passes through the two mutually contacting faces of the two prism components. While this particular design and application of the Nicol-type prisms is advantageous, it is not indispensable. That is, a device otherwise on the principles of FIG. 4 may also be provided with normal Nicol prisms or with polarization prisms, such as those according to Rochon or Wollaston, the arrangement of the components being then modified accordingly.

By virtue of the push-pull control of members 325 and 325', the modulated beams 326 and 327 issuing from the device have respective complementary intensities, and the radiation intensity inside the resonator between the boundary reflectors 322 and 322' remains constant, independently of the modulation. The device according to FIG. 4, like the one shown in FIG. 3, has a high quality factor, i.e. slight internal losses, but is suitable for considerably higher maximum values of modulation frequency than a device according to FIG. 3. When employing KDP crystals for the control members 325 and 325', is it advisable to cut them in such a manner that the crystal surfaces are perpendicular to the optical axis of the KDP crystal, and to orient the optical axis of the crystal parallel to the beam 323 and the (1) or 100-plane parallel to the polarization plane of the beam 323, referring to he field-free condition.

The electrical control fields, particularly when the control members 325, 325' consist of KDP crystals, are preferably applied in the direction of the optical axis which is coincident with the direction of the radiation 323. The electrodes required for thus applying the electric field are denoted by 329, 330 and 329', 330'. These electrodes are transparent to the radiation 323. They are connected to a source of modulating voltage, for example in the same manner as shown in FIG. 3. With this particular choice of electric field strength, optical axis and radiation direction in the modulation controlling crystal, an additional direct voltage must be impressed across the electrodes 329 and 330, 329' and 330' so that, when a modulating voltage is absent, the beams 326, 326' and 327, 327' are coupled out of the resonator with a median intensity. Then the alternating electric fields produced in members 325 and 325' by the modulating voltages have the effect of varying the intensity of the emitted beams 326, 326' and 327, 327' about the median value.

With KDP and similar crystals, other than the abovementioned orientations of the crystal and other directions of the applied modulating fields relative to the beam and polarization directions of the radiation 323, can also be employed for modulating the laser radiation in accordance with the invention. Particularly applicable are arrangements in which the field is perpendicular to the direction of the beam 323 in member 325 or 325'. This makes it unnecessary to have the radiation pass through the appertaining electrodes. Also applicable are orientations of the crystal at which a natural double refraction is present when the modulating alternating field is absent, so that no electrical unidirectional field need be superimposed for imparting a median intensity to the emitted beams 327 and 327'.

The attainable maximum of modulation frequency in a device according to FIGURE 4 is determined by the travel period $t$ of the laser radiation between the control members 325 and 325'. This travel time $t$ must be shorter than the cycle period $T$ of the maximal modulation frequency. If the required modulation frequencies are not too high, the decoupling members 324' and 324" may be omitted. In this case, the attainable maximal modulation frequency is essentially determined by the travel period $t'$ of the laser radiation from control member 325 through the path 322–325–325'–322' to 325'. In this case, the period $t'$ must be shorter than the modulation cycle period T.

A factor 2 in the intensity of one of the modulated beams issuing from the laser device is obtained by combining two mutually correlated beams, for example beams 327 and 327'. By omitting the decoupling member 325', the independent beam 327 is eliminated so that its intensity coincides with that of beam 327. Then both the travel time $t$ and the travel time $t''$ of the laser radiation from control member 325 to reflector 322' and back to member 325' are essential with respect to the attainable maximum value of modulation frequency. In this case, the attainable modulation frequencies, in practice, are just as high as those reached in a device according to FIG. 4 with the aid of the decoupling member 324'; however, when the decoupling member 324' is omitted, there occurs a slight change in the quality factor of the entire laser resonator in dependence upon the modulation degree of the emitted radiation, and therefore a frequency-dependent distortion of the modulated output.

As in the embodiments described with reference to FIGS. 1 to 3, the components shown apart from each other in FIG. 4 can be placed together. Thus, for example, the reflector 322 may be constituted by the silvered left-hand end face of a crystal rod constituting the laser medium 321.

Another way according to the invention of achieving a high maximal modulation frequency is embodied in the device shown in FIG. 5. With respect to the individual modulation and decoupling means, this device is similar to that of FIG. 2, except that each of these means appears twice. The device of FIG. 5 further differs from those of FIGS. 1 to 4 in that the laser radiation does not travel back and forth but is guided on a circulatory path.

Denoted by 331 in FIG. 5 is a laser crystal corresponding to the laser-active medium 1 or 321 mentioned above. The path of internal radiation within the resonator arrangement comprises two control members 332 and 332' which may be identical with those denoted by 325 and 325' in FIG. 4. The device is further equipped with decoupling members 333 and 333', for example Nicol prisms, which divide incipient beam into component beams of respectively different polarization directions and cause the component beams to issue in respectively different directions. The polarizing prisms are constituted and arranged in the same manner as the decoupling member 324 in FIG. 2.

The device of FIG. 5 further comprises deflection prisms 334 and 334' which totally reflect the radiation 335 to change its direction, thus causing it to circulate in the arrangement. It is preferable to prevent the radiation 335 from passing in one of the two possible directions. This permits attaining higher modulation frequencies. This purpose is served by a non-reciprocal optical guide 336. It consists, for example, of two members 337 and 337' which rotate the polarization direction, for example by the magneto-optical rotation effect. Disposed between members 337 and 337' is a polarization analyzer 338. The polarization rotating member 337 just eliminates the rotation of the polarization plane produced by the member 337'; and the polarization analyzer 338 is oriented to permit the passage of only the polarization direction rotated by the member 337'. In the device of FIG. 5, the non-reciprocal guide permits the radiation 335 to travel only in the direction of the arrows 339, 339'.

The control members 332, 332' are subjected to an electric field by means of electrodes as described above, so that these control members vary their optical behavior and modulate the laser radiation. The modulation is effective at relatively low modulation frequencies of about 0.1 or 1 gigacycle per second. For higher frequencies, higher than the approximate limit of 1 gigacycle per second, the control members 332 and 332' are mounted in hollow conductors in which they are controlled by the fields of electromagnetic waves guided in the hollow conductors. Such a hollow conductor arrangement is schematically indicated at 340 in FIG. 5 and is separately shown by FIG. 6 in section on larger scale and turned 90° about the optical axis.

The hollow conductor arrangement of FIG. 6 has the design of an interdigital conductor 341. The control members 342 and 342' in FIG. 6 correspond to those denoted by 332 and 332' respectively in FIG. 5. The electromagnetic wave travelling in the hollow conductors 341', 341'' passes sequentially through the control members 342 and 342'. Due to the field reversal, the wave reverses its phase in the zone 341'''. The travel time of the wave in the device of FIG. 6 from 341' through 341'' to 341''' is chosen to be at least approximately equal to the travel time required for the laser radiation 332 to pass from 334 to 332'; or it is made longer or shorter than the latter time by an integral multiple of the cycle period of the median modulation frequency, for example a relatively narrow band of high frequencies. Under these conditions, the control members 332, 332' and 342, 342' act in mutually opposed relation upon the circulating radiation 335, thus also realizing a push-pull modulation. The wave passing through the interdigital conductor 341 is produced, for example, in a likewise modulated generator 344 and is damped (attenuated) in a reflection-free terminating impedance 345.

As mentioned above, the control members 332, 332' may be given a design corresponding to that of members 325, 325' in FIG. 4. The incoming laser radiation is separated by the controlled double refraction to issue in two directions of polarization. The radiation in one of these polarization directions continues to remain in the resonator. The share of laser radiation now polarized in the perpendicular direction is deflected by the decoupling members 333, 333' in the directions 335', 335''. The beams 335' and 335'' issuing from the laser device are modulated in push-pull relation to each other.

In contrast to the mode of operation described above with reference to FIG. 6, the control members 332 and 332' may also be modulated in synchronism with each other, rather than in push-pull relation, in cases where very high modulation frequencies are involved. For this purpose, the control members are built into hollow conductors, preferably in close proximity to each other and, if desired, as a single component which combines both members 332 and 332'. For this mode of operation, the laser arrangement is so tuned that the travel time of the radiation circulating in the laser resonator in the same direction between 332 and 332' is equal or approximately equal to one-half of the cycle period of the modulation frequency, or is equal to an odd multiple of the modulation cycle period. In this manner, the two control members, although simultaneously controlled in the same sense, act in push-pull relation upon the laser radiation. This affords a narrow-band modulation at those frequencies to which this laser arrangement is tuned. Despite the relatively small frequency bandwidth of this modulation method, a very high absolute bandwidth can be transmitted on account of the high median modulation frequency.

Another possibility to perform the modulation, particularly a narrow-band modulation, is to tune the travel time of the micro-wave radiation from one to the other control member, provided for push-pull modulation and preferably arranged in a hollow conductor, so that this travel time is longer or shorter than the travel time of the laser radiation from one to the other control member by, accurately or approximately, one-half of the cycle period that corresponds to the median modulation frequency. With this particular tuning, the necessity for phase reversal is eliminated. At extremely high modulation frequencies, at which the travel time of the micro-wave and/or laser radiation in the control member reaches the order of magnitude of the cycle period corresponding to the modulation frequency, it is advisable to provide for an arrangement in which the laser radiation and the micro-wave radiation pass through the control members in parallel relation to each other and in the same travel direction.

FIG. 7 illustrates a combined radiator and decoupler. In FIG. 7, layers 61, 62 and 63 are three of a plurality of dielectric layers. The dielectric layers, including the dielectric layers 61, 62 and 63, are arranged in sequence in the radiation path and have variable refraction indices and appropriate thickness relative to each other. The dielectric layers 61, 62 and 63 replace the normal interference mirror of FIG. 1.

At least one of the dielectric layers 61, 62 and 63 has a refraction index which is controllable by the field intensity. The electrodes 8 and 9, described with reference to FIG. 1, provide between them the electric field of the electric voltage source 12 (FIG. 1) and of the direct voltage source 70, if said direct voltage source is utilized. A permeable base such as, for example, a glass plate 66, is provided for the dielectric layers.

To those skilled in the art it will be obvious upon a study of this disclosure that our invention permits of a variety of modifications and hence can be given embodiments other than particularly illustrated and described herein, without departing from the essential features of our invention and within the scope of the claims annexed hereto.

We claim:
1. The method of emitting from a laser resonator having a radiation path amplitude-modulated radiation with a low distortion noise factor, comprising the steps of
    modulating and coupling radiation generated internally of said resonator;
    maintaining a minimum modulation frequency which is higher than the minimum frequency of a determined range of high frequencies having a cycle period which is small in comparison with the build-up and decay periods of laser oscillation resulting in the resonator from a resonator quality change causer by modulation of the laser radiation;
    excluding from the modulation frequencies the forbidden frequencies of the resonator which are signals corresponding to the travel time of the laser radiation in the resonator and integral multiples thereof;
    partitioning a limited minor portion of the internally generated radiation of said resonator; and
    coupling said minor portion out of said resonator to maintain the internal radiation intensity substantially constant and thereby coupling out of said resonator distortion-free radiation.

2. The method of emitting from a laser resonator having a radiation path amplitude-modulated radiation with a low distortion noise factor, comprising the steps of
    modulating and coupling radiation generated internally of said resonator;
    partitioning a limited minor portion of the internally generated radiation of said resonator; and
    coupling said minor portion out of said resonator at a degree of coupling out of the modulated radiation which is less than 2% to maintain the internal radiation intensity substantially constant and thereby coupling out of said resonator distortion-free radiation.

3. The method as claimed in claim 1, wherein the degree of coupling out of the modulated radiation is less than 2%.

4. The method as claimed in claim 1, wherein the modulating and coupling of the radiation is adjusted to couple out of the resonator an external beam having a portion of finite constant intensity.

5. The method as claimed in claim 1, wherein a unidirectional field superimposed upon an alternating modulating field is applied to the radiation to couple out of the resonator an external beam of radiation with a portion of finite constant intensity.

References Cited
UNITED STATES PATENTS

| | | | |
|---|---|---|---|
| 3,102,959 | 9/1963 | Diemer | 250—199 |
| 3,229,223 | 1/1966 | Miller | 250—199 XR |
| 3,243,724 | 3/1966 | Vuylsteke | 250—199 |
| 3,243,722 | 3/1966 | Billings | 250—199 XR |

FOREIGN PATENTS 608,711    3/1962    Belgium.

ROBERT L. GRIFFIN, *Primary Examiner.*

A. J. MAYER, *Assistant Examiner.*

U.S. Cl. X.R.

332—7.51